United States Patent [19]

Jepsen

[11] Patent Number: 4,516,986

[45] Date of Patent: May 14, 1985

[54] TWO-PHASE FLOW SPLITTER

[75] Inventor: John C. Jepsen, Spring, Tex.

[73] Assignee: Shell Oil Company, Houston, Tex.

[21] Appl. No.: 594,500

[22] Filed: Mar. 29, 1984

[51] Int. Cl.³ .............................................. B01D 47/00

[52] U.S. Cl. .......................................... 55/18; 55/396; 55/263; 137/110; 138/44; 122/34

[58] Field of Search ....................... 55/1, 18, 261, 263, 55/391, 392, 394, 396; 137/561 A, 564, 87, 88, 177, 89, 183, 110; 138/44; 122/34

[56] References Cited

U.S. PATENT DOCUMENTS

| | | | |
|---|---|---|---|
| 557,109 | 3/1896 | Cochran | 55/396 |
| 2,811,223 | 10/1957 | Newton | 55/261 |
| 2,849,079 | 8/1958 | Evans | 55/292 |
| 4,140,178 | 2/1979 | Ohlswager et al. | 137/561 A |
| 4,144,804 | 3/1979 | O'Keefe | 137/110 |
| 4,261,298 | 4/1981 | McDonald et al. | 122/34 |

FOREIGN PATENT DOCUMENTS

| | | | |
|---|---|---|---|
| 1064295 | 8/1959 | Fed. Rep. of Germany | 55/396 |
| 209337 | 2/1980 | German Democratic Rep. | 55/1 |
| 929176 | 5/1982 | U.S.S.R. | 55/220 |

*Primary Examiner*—Bernard Nozick

[57] ABSTRACT

A method and apparatus for withdrawing with a minimum pressure loss a portion of a fluid flowing in a main line wherein the fluid comprises a vapor-liquid mixture. The apparatus uses a flow restriction in the main line with the portion being withdrawn from the low pressure area of the flow restriction. The flow restriction includes means for removing liquid from the flow and combining a metered amount of the liquid with the portion of the flow that is removed from the main line.

14 Claims, 2 Drawing Figures

TWO-PHASE FLOW SPLITTER

BACKGROUND OF THE INVENTION

The present invention relates to a distributing apparatus and particularly to an apparatus which is designed to divide or split a single stream of a two-phase flow, for example, vapor liquid into a plurality of individual streams with minimum pressure loss in which each of the individual streams has substantially the desired ratio of vapor to liquid. In many processes a main flow of vapor liquid must be divided or split into several individual streams while maintaining the desired liquid to vapor ratio in the individual streams. For example, a central power plant or furnace may be used to supply process heat in the form of steam to several individual processes or locations. It is necessary that the main steam flow be divided into several individual flows to supply the individual locations. It is obvious that one must maintain the desired ratio of vapor to liquid in each of the individual flows or the individual flows located the greatest distance from the source will consist primarily of water and very little steam. Also, the distribution must conform to a desired pattern and not produce abnormalities or variations.

The problem is more acute in thermal recovery projects where steam is being injected into hydrocarbon bearing formations to increase the production. In these systems it is very common to use low quality steam, for example, 80% quality steam. The practice of using low quality steam is necessitated by the need to utilize low quality or brackish waters in the generation of the steam. To prevent the salts and other minerals from depositing on the steam generator tubes, it is necessary to retain part of the flow in a liquid state in order to maintain the salts and other impurities in solution. If it is necessary to distribute this low quality steam to several individual injection wells from one large pipeline, the problem that arises is one of dividing the main flow into the individual flows with minimum pressure loss while maintaining the desired ratio between vapor and water in the individual flows.

The above problem of thermal recovery projects will become even more acute when large cogeneration plants are installed. The cogeneration plants will produce both electricity and the steam required for the thermal recovery process. These plants will be centralized and the initial steam flow for thermal recovery will be large and must be divided into the individuals flows for individual wells. These centralized plants will require that the initial distribution of steam will be through large diameter main flowlines with minimum pressure loss.

The common practice is to use tee convections to split the main flow into separate streams. It is possible using properly designed tees to split the main flow and maintain the desired vapor liquid ratio. While the vapor liquid ratio is maintained the pressure loss in a tee is high. The pressure loss results from the loss of inertia in the liquid as it flows through the tee.

In the prior art, for example, U.S. Pat. No. 3,899,000, it is suggested that a liquid vapor mixture could be separated into two or more individual flows by use of a closed vessel. The vessel is mounted vertically and provided with a top inlet and two bottom outlets. A flat horizontal baffle is used to divert the inlet flow from the open ends of the outlets. The axis of the inlet and the axis of the outlets are substantially parallel so the flow of the liquid vapor is axially through an elongated vessel. The liquid vapor ratio is maintained by utilizing the outlets as standpipes and the vessel as a reservoir. Once sufficient liquid collects in the bottom of the vessel, it can overlow the top of the outlets and liquid will be added to the vapor flowing out of the outlets. While this system may be satisfactory it does rely upon the condensing of the liquid, separating it from the vapor and then recombining it with the vapor. This is an inefficient way to separate the main stream into the individual streams and results in a loss of overall energy from the system. Also, an equal amount of water will be added to each standpipe regardless of its size and the vapor liquid ratio may not be the same in each outlet depending on the sizes of the individual outlets.

SUMMARY OF THE INVENTION

The present invention solves the above problems by providing a simple device that can be mounted directly in the main flowline for separating or withdrawing a portion of the liquid vapor flow from the main flowline with a minimum of pressure loss. In particular, the system utilizes a flow restriction which is placed in the main flowline and the vapor liquid mixture is withdrawn from the low pressure area created by the flow restriction. In particular, the flow restriction comprises a short pipe section having a smaller diameter than the main flowline and mounted coaxially in the main flowline. The short tubular section is supported by a baffle which blocks the flow of the liquid around the outside of the pipe section. In addition the baffle creates a dead-ended volume which effectively collects the liquid separated from the flow stream. In the case of wet steam the water will not be equally distributed throughout the stem but will tend to migrate toward the wall of the main flowline and flow along the wall of the flowline. Only a small portion of the water will be entrained in the steam as small drops. Thus, the system will effectively separate the water from the main flow and collect it in the dead-end volume. The collected water can then be added to the vapor or steam that is withdrawn from the main flowline to maintain any desired liquid vapor ratio. Any excess water which is trapped in the closed end volume will eventually overflow the end of the short pipe section and be combined with the main flow.

The amount of water added to the branch flowline can be controlled by using a flow meter to measure the flow in the branch line. The flow meter can then position a valve in the line supplying water to the branch line.

Since the use of the flow restriction will create a low pressure area, the pressure differential between the low pressure area and the main flow is used to produce a flow in the branch line. Thus, no special designs are required to ensure that an adequate flow is maintained in the branch line. In addition, since the water collected in the closed end volume will be at a higher pressure than the flow in the branch line, it will be a simple matter to add the desired quantity of this water to the flow in the branch line.

BRIEF DESCRIPTION OF THE DRAWINGS

The present invention will be more easily understood from the following detailed description of a preferred embodiment in which.

DESCRIPTION OF A PREFERRED EMBODIMENT

Figure 1:
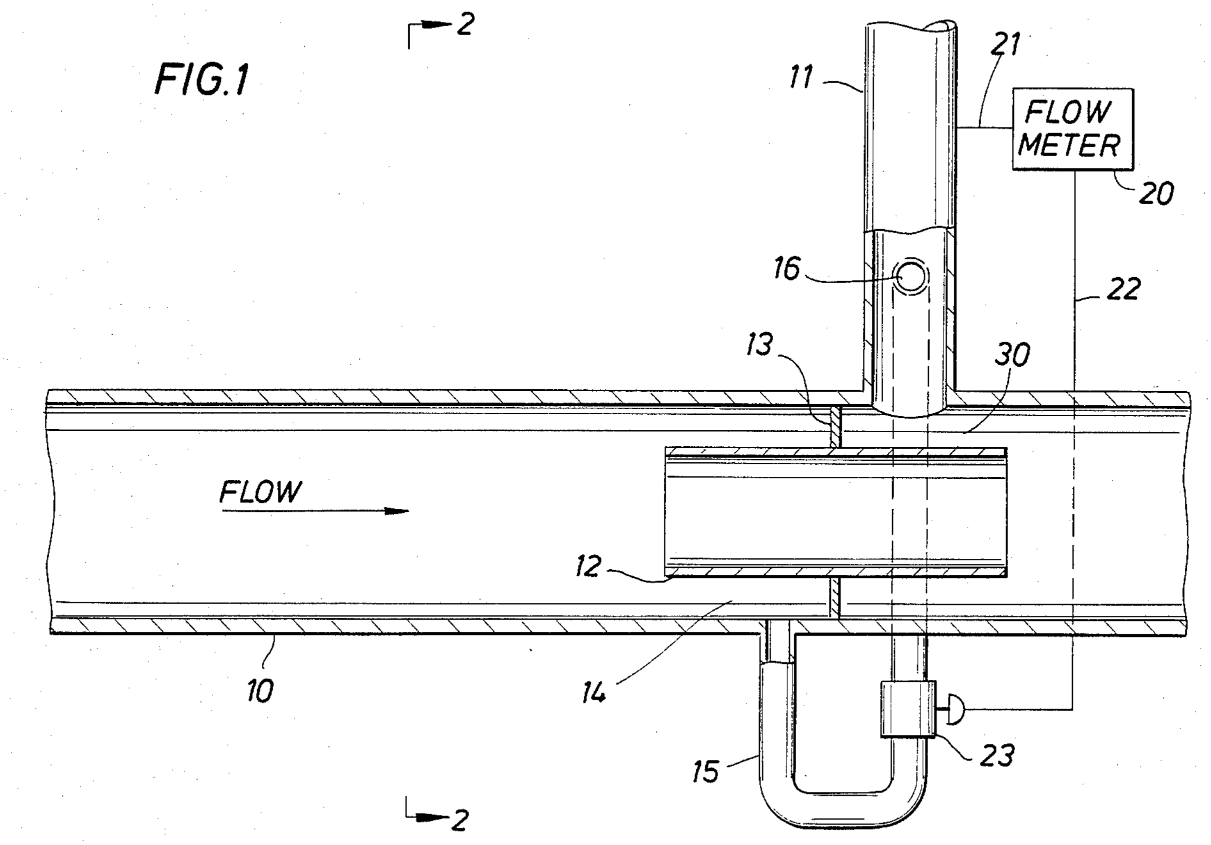
FIG. 1 is an elevation view shown in cross section of an apparatus constructed according to this invention.
Figure 2:
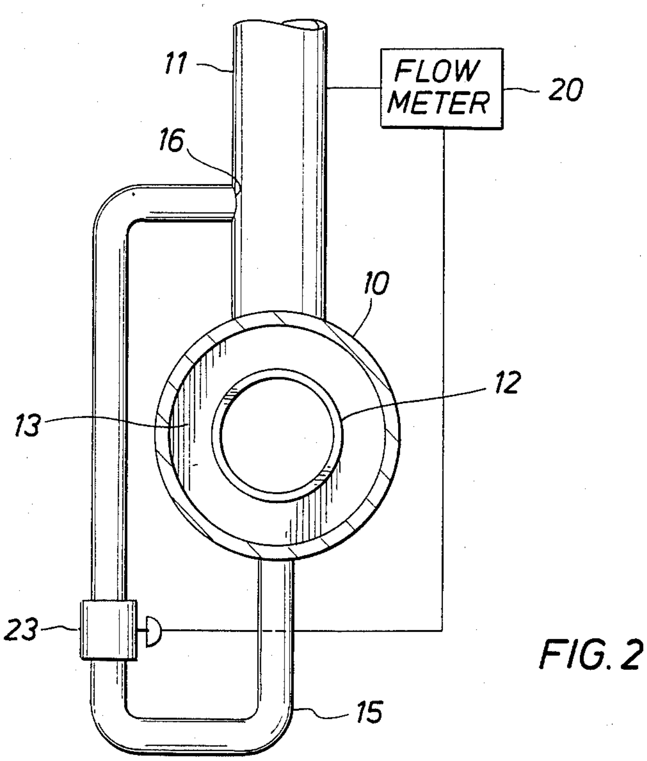
FIG. 2 is an end view of the apparatus shown in FIG. 1.

Referring to the drawings there is shown a main flowline 10 and a branch line 11 for removing a portion of the liquid vapor flow in the main flowline. As explained above, the main flowline may be a main steam line which is conveying process steam to a number of process locations throughout a plant. In this case, it was necessary to split the main steam flow into individual flows at the location of the various processes. When a portion of the steam is removed it is desirable that the steam water ratio or quality of the steam be maintained at some desired level to prevent the accumulation of water at the end of the steam line. This requires that some means be provided for maintaining desired steam quality in each of the branch flowlines. While it is possible in case of processes such as refinery chemical processes, to supply substantially dry steam or even super heated steam in the main flowline, this is not possible in most thermal recovery processes.

In the case of thermal recovery processes the steam injected into the hydrocarbon bearing formation is effectively lost except for the small quantity of water that is produced with the hydrocarbons. This portion of the water can be separated from the hydrocarbons and after proper treatment, reused. Thus, the large quantity of water required in thermal recovery processes can only be supplied from brackish well water. To overcome the problem of the salts and minerals condensing on the heat exchanger tubes, it has become common practice to use relatively low quality, for example, 80% quality steam and maintain the salts and minerals in solution. Thus, if the main steam flow is to be divided or split into several flows for individual wells, it is paramount that the branch flows be maintained substantially at the same quality as the main flow. If the branch flows are not maintained at the same quality some wells will receive substantially dry steam while others will receive only hot water. Most recovery processes are designed on the assumption that all injection wells receive the same quality of steam. This permits an accurate determination of the thermal energy injected into the formation by each injector well.

In the drawings there is shown a flow restriction means 12 which may, for example, be a short section of pipe mounted coaxially within the main flowline 10. Preferably, the short section of pipe 12 has a length-to-diameter ratio of between 2 and 5 and an area which is at least one half of the area of the main flowline 10. The short pipe section is supported in the main flowline by annular shaped baffle or plate 13. The outer edge or periphery of the plate 13 is firmly attached by welding or similar means to the inner wall of the main flowline while its inner edge is securely attached to the short pipe section or flow restriction means 12 by welding.

The plate 13 in addition to forming a support for the pipe section 12 also forms a closed end annular volume 14 in the main flowline. As explained above, substantially all of the water contained in the steam flowing in the line 10 will flow along the wall of the main flowline as an annular flow. The closed end volume 14 will effectively remove most of the water from the steam flow from the steam in the main flowline. Once the volume 14 fills, it will overflow into the pipe 12 and be recombined with the main steam flow. Approximately twothirds of the liquid will flow along the bottom of the pipe and the line 15 described below should be mounted in the bottom of the pipe.

A portion of the water contained in the volume 14 is added to the flow in the branch line 11 by means of a line 15 which connects with the branch line at position 16. The flow in the line 15 can be controlled by means of a flow meter 20 which senses the steam flow in the branch line at position 21. The flow meter is connected by suitable means 22 to position the diaphragm valve 23 to control the flow of water.

An alternative to the use of a flow control valve and flow meter would be the use of a line 15 sized to add the desired amount of water to the steam flow in line 11. This would eliminate the control valve and flow meter and the maintenance associated with them.

From the above description it is appreciated that the branch flow line is located downstream of the annular plate 13 in an area of substantially dry steam and low pressure. This will ensure an adequate flow of steam into the branch line under substantially dry conditions. The water removed from the steam flow and collected in volume 14 will not readily mix with steam in the area 30 when it overflows the volume 14 and recombines with the steam flow in pipe section 12. This will permit the addition or recombining of a desired amount of water with the steam flow in the branch line 11. Normally, the steam flow in the branch line 11 will have the same quality as the main flow 10. Thus, if the steam flow in the main line is of 80% quality, i.e., containing 20% water by weight, the flow in the branch line 11 will also be maintained at 80%. This will be easily accomplished by means of a flow meter 11 and control valve 23 or by sizing the line 15 to add this quantity of water to travel line 11.

The use of individual apparatus for dividing or splitting the main steam flow at each use location reduces the length of the branch flow lines. This will tend to reduce the heat loss since less surface area of pipe is exposed to heat loss. The apparatus uses standard pipe and fittings and can be constructed in the field if desired. Of course, it can also be prefabricated as a complete unit for field installation. The apparatus will result in minimal pressure loss and will work in all gas/liquid regimes.

What is claimed is:

1. An apparatus for removing, with minimum pressure loss, a portion of a vapor-liquid fluid flowing in a main line to form an auxiliary flow having a preset vapor-liquid ratio, said apparatus comprising:
- a main flowline;
- a flow restriction disposed in said main line;
- baffle means for causing vapor-liquid flow to pass through the restriction;
- trap means associated with said flow restriction for removing a substantial portion of the liquid from the fluid flowing in the main line;
- a branch line for removing said portion of the fluid flow from said main flowline, said branch line being coupled to said main line in the low pressure area created by said flow restriction; and
- a liquid line, said liquid line being coupled to said removal means and said branch line to restore a predetermined amount of said liquid to the fluid flow in the branch line.

2. The apparatus of claim 1 and in addition meter means disposed to measure the flow in the branch line and flow control means disposed in said liquid line to control the flow therein in response to the measured flow in the branch line.

3. The apparatus of claim 1 wherein said flow restriction comprises a flowline of reduced cross sectional area mounted in said flowline.

4. The apparatus of claim 3 wherein said trap means is formed by said baffle means that surrounds said reduced cross sectional area flowline.

5. The apparatus of claim 4 wherein said liquid line connects to said flowline on the high pressure side of said annular plate.

6. The apparatus of claim 1 wherein said flow restriction comprises a short length of a tubular member mounted coaxially in said main line and said trap means includes an annular plate, the edges of said plate being connected to both said short tubular member and said main line to effectively seal the annular opening between said members and form an enclosed volume open at the upstream end to fluid flowing in the main line.

7. The apparatus of claim 6 wherein said main line and short tubular member are circular pipe members.

8. The apparatus of claim 7 wherein the short tubular member has a diameter between one-quarter and three-quarters of the diameter of the main line and an overall length of between 2 and 5 diameters.

9. A method for withdrawing, with minimum pressure loss, a portion of a vapor-liquid fluid flowing in a main line while maintaining a preset vapor-liquid ratio in the withdrawn fluid, said method comprising:

restricting the flow of the fluid in the main line;

removing a portion of the liquid from the fluid in the main line upstream of the restricted flow;

withdrawing a portion of the fluid from the main line in the low pressure area produced by said flow restriction; and combining a preset portion of the liquid removed from the main line with the portion of the fluid withdrawn from the main line.

10. The method of claim 9 wherein the fluid is a wet stream.

11. The method of claim 10 wherein the quality of the steam in the main line and the withdrawn portion are the same.

12. The method of claim 10 wherein the quality of the steam in the main line and the withdrawn portion are different.

13. The method of claim 10 wherein a major portion of water is removed from the fluid.

14. The method of claim 13 wherein the restricted flow of said fluid is substantially water-free and the portion of the liquid removed from the main line that is not combined with the fluid withdrawn from the main line is recombined with the fluid in the main line.

* * * * *